May 3, 1955   A. F. L. ANDERSON   2,707,376
ROTARY HYDRAULIC COUPLING
Filed Oct. 8, 1947

INVENTOR.
Axel F. L. Anderson
BY
Andrew K. Foulds
his ATTORNEY

United States Patent Office 2,707,376
Patented May 3, 1955

2,707,376
ROTARY HYDRAULIC COUPLING

Axel F. L. Anderson, Detroit, Mich., assignor to American Blower Corporation, Dearborn, Mich., a corporation of Delaware Application October 8, 1947, Serial No. 778,549

2 Claims. (Cl. 60—54)

This invention relates to new and useful improvements in hydraulic couplings generally and more particularly to improved means for varying the speed of hydraulic couplings.

One of the objects of this invention is to provide a new and improved hydraulic coupling.

Another object is to provide a hydraulic coupling having an improved means for varying the speed thereof.

Other objects will become apparent from time to time throughout the specification and claims as hereinafter related.

This invention consists of the new and improved construction and combination of parts, to be described more fully hereinafter, and the novelty of which will be particularly pointed out and distinctly claimed.

Figure 1:
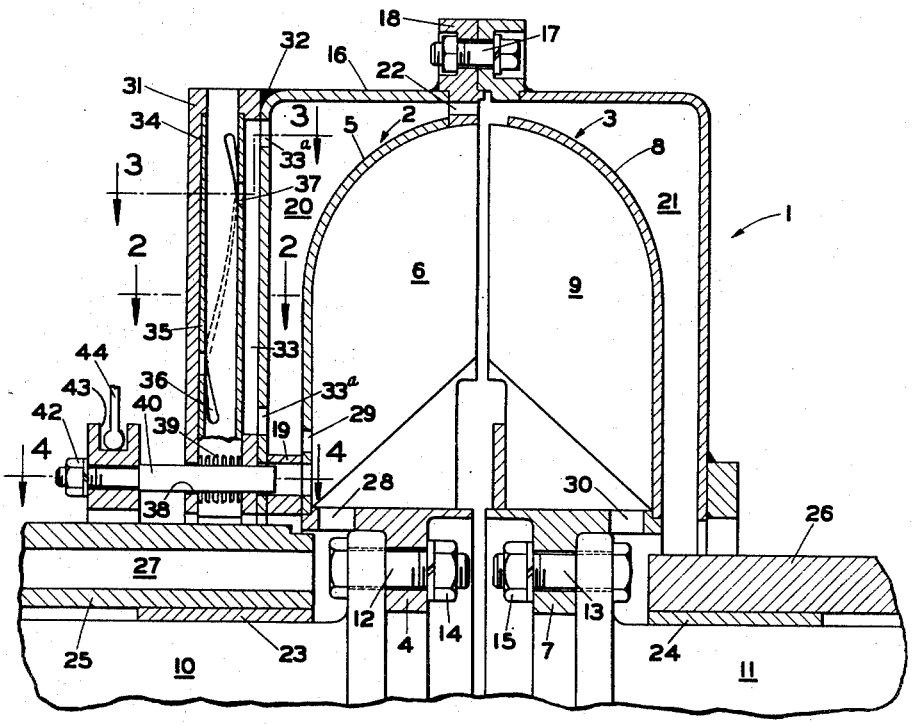
Figure 2:
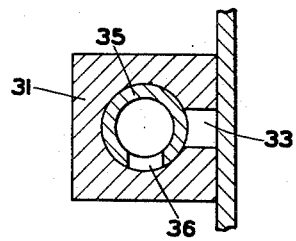
Figure 3:
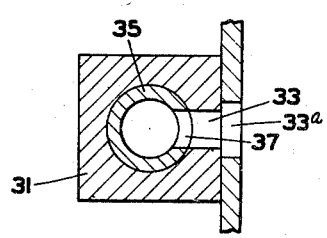
Figure 4:
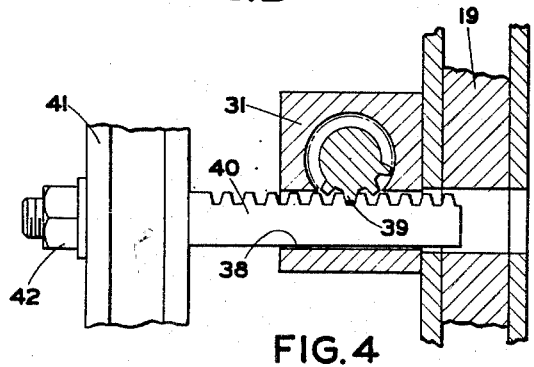

In the accompanying drawing, to be taken as a part of this specification, there is clearly and fully illustrated a preferred embodiment of this invention, in which drawing:

Figure 1 is a view in vertical section of the upper half of a hydraulic coupling embodying this invention, the lower half being substantially symmetrical, Fig. 2 is a view on the section line 2—2 of Fig. 1 of the outlet valve member of the coupling, Fig. 3 is a view similar to that of Fig. 2 but taken on the section line 3—3, and Fig. 4 is a sectional view taken on the line 4—4 of Fig. 1 showing the rack and pinion arrangement by which the outlet valve of the coupling is adjusted.

Referring to the drawing by character of reference there is a hydraulic coupling 1 comprising an impeller 2 and a runner 3. The impeller 2 comprises a hub 4 and bowl portion 5 in which are carried a plurality of vanes 6. Similarly the runner 3 comprises a hub 7 and a bowl portion 8 and vanes 9 respectively. The impeller 2 and runner 3 are carried by shafts 10 and 11 respectively to which they are secured at their hubs by bolts 12 and 13 and nuts 14 and 15 or similar connecting linkages. There is a casing 16 carried by the impeller 2 comprising two sections which are bolted together as at 17, the casing being supported by the impeller at 18 and 19. The casing 16 encloses with the impeller 2 and runner 3 a pair of chambers 20 and 21 which are interconnected by a plurality of apertures 22.

The shafts 10 and 11 respectively are supported by bearings 23 and 24 which are carried by bearing sleeves or supporting members 25 and 26. The bearing sleeve 25 has a passageway 27 extending therethrough which communicates with an aperture 28 in the impeller hub 4 and which is operable to conduct liquid to the space enclosed by the impeller and runner bowls 5 and 8. There is an aperture 29 in the impeller bowl 5 and an aperture 30 in the runner hub 7 which are operable to vent air from the coupling during filling with liquid.

There is a valve member housing 31 in the form of a rectangular block which is carried by the casing 16 and secured thereto as at 32 by welding. The valve member housing 31 extends radially of the casing 16 and has a slot 33 extending longitudinally thereof. There is a longitudinal cylindrical opening 34 extending through the valve member housing 31 into which opens the slot 33. The slot 33 communicates with the interior of the casing 16 through a pair of apertures 33a in the wall thereof. Rotatably positioned in the cylindrical opening 34 is a hollow cylinder 35 which has a spiral slot 36 therein. The spiral slot 36 has a longitudinal length slightly less than the radius of the impeller bowl 5 as measured from the hub 4 and extends through a cylindrical angle of less than 360° (the amount less than 360° will be substantially equal to the angle intercepted by the longitudinal slot 33). The intersection of the spiral slot 36 and the longitudinal slot 33 forms an outlet port 37 which is movable as the cylinder 35 is rotated. The distance between the section lines 2—2 and 3—3 represents the approximate movement of the port 37 upon 90° of movement of the cylinder 35. Extending transversely through the valve member housing 31, the casing 16, and supporting portion 19 of the impeller bowl 5 is a passage 38 which partially intersects the cylindrical opening 34. The lower portion of the cylinder 35 has gear teeth 39 positioned thereon forming a pinion for rotation thereof. There is a rack 40 positioned in the passage 38 which is cooperable with the gear teeth 39 upon longitudinal movement. The rack 40 is secured to a collar 41 by a nut 42, the collar 41 having a track 43 for movement by a slidable pin or collar 44.

In operation this invention functions as follows:

Liquid for the operation of the coupling is supplied through the passageway 27 and aperture 28 to the space enclosed between the impeller and runner bowls 5 and 8. Within the space between the bowls 5 and 8 a working circuit of liquid is set up for the transfer of kinetic energy from the impeller to the runner. Excess liquid from the working circuit is discharged into and fills the chambers 20 and 21 to a level substantially equal to the effective level of liquid in the working circuit. (The effective level of liquid in the working circuit being the level which the liquid would assume if there were no power loss between the impeller and the runner, that is, if the impeller and runner were running at the same speed.) The aperture 30 in the runner hub functions to vent air from the coupling during filling. The aperture 29 in the impeller bowl permits venting of air from the chamber 20 to the interior of the coupling thereby to equalize the liquid levels in the chambers 20 and 21. The amount of liquid in the working circuit (or the effective level of liquid) controls directly the speed of the runner, the runner speed varying inversely with the effective level of liquid as measured radially inward. The level of liquid in the chambers 20 and 21 which controls the effective level of liquid in the working circuit is controlled by the position of the outlet port 37, since all liquid radially inward of the port 37 will be discharged therethrough. When the collar 41 is moved the rack 40 will cause the pinion or gear teeth portion 39 of the cylinder 35 to rotate thus moving the port 37 radially inward or outward of the coupling to control the amount of fill of the coupling.

What is claimed and is desired to be secured by Letters Patent of the United States is:

1. In a hydraulic coupling, an impeller, a runner, said impeller and said runner being operable to enclose a working circuit of liquid for transfer of kinetic energy therebetween, a casing carried by and rotatable with said impeller and operable to enclose a chamber positioned axially of said working circuit for receiving liquid from said working circuit, means to conduct liquid to said working circuit, the amount of slippage between said impeller and said runner varying inversely with the effective level of liquid in said working circuit, the effective level of liquid in said working circuit varying directly with the level of liquid in said chamber, and being substantially equal to the level of liquid in said chamber, a member carried by and positioned axially of said casing, said member having a cylindrical passageway extending substantially radially therethrough and having a substantially radial slot communicable with said passageway, said slot extending from the maximum effective level of liquid in said working circuit toward the periphery of said circuit, said casing having an aperture opening into the outer end of said slot, a hollow cylindrical member rotatable about its own axis and positioned in said passageway, said cylindrical member having a spiral slot in the wall thereof cooperable with and intersecting said longitudinal slot to form an outlet port for discharge of liquid from said casing, said cylindrical member upon rotation about its own axis acting to move said spiral slot relative to said longitudinal slot thereby to determine the radial position of said port, and means to rotate said cylindrical member on its own axis.

2. In a hydraulic coupling, an impeller, a runner, said impeller and said runner being operable to enclose a working circuit of liquid for transfer of kinetic energy therebetween, means to conduct liquid to said working circuit, the amount of slippage between said impeller and said runner varying inversely with the effective level of liquid in said working circuit, means positioned axially of said working circuit and operable to determine the effective level of liquid in said working circuit, said last-named means including a member having a cylindrical passageway extending substantially radially therethrough, and having a substantially radial slot communicable with said passageway, said slot extending from the maximum effective level toward the periphery of said circuit, said slot being communicable with said working circuit, a hollow cylinder positioned within said cylindrical passageway laterally of said slot and having a spiral slot in the wall thereof and intersecting said first-named slot to form a port for discharge of liquid from said working circuit, and said cylinder being rotatable on its longitudinal axis to determine the point of intersection of said spiral slot and said first-named slot thereby to determine the radial position of said port.

References Cited in the file of this patent

UNITED STATES PATENTS

| | | |
|---|---|---|
| 1,866,424 | Schmieske | July 5, 1932 |
| 2,187,656 | Kiep et al. | Jan. 16, 1940 |
| 2,380,595 | Hertrich | July 31, 1945 |
| 2,557,894 | Siesel | June 19, 1951 |